US012555951B2

(12) United States Patent
Drews et al.

(10) Patent No.: US 12,555,951 B2
(45) Date of Patent: Feb. 17, 2026

(54) PLUG-IN CONNECTOR AND PLUG-IN CONNECTOR ARRANGEMENT FOR SIMPLIFIED MANUFACTURING

(71) Applicant: Phoenix Contact GmbH & Co. KG, Blomberg (DE)

(72) Inventors: Markus Drews, Steinheim (DE); Karsten Krome, Detmold (DE); Thomas Kaps, Vlotho (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 376 days.

(21) Appl. No.: 17/915,531

(22) PCT Filed: Apr. 1, 2021

(86) PCT No.: PCT/EP2021/058579
§ 371 (c)(1),
(2) Date: Sep. 29, 2022

(87) PCT Pub. No.: WO2021/198405
PCT Pub. Date: Oct. 7, 2021

(65) Prior Publication Data

US 2023/0129127 A1 Apr. 27, 2023

(30) Foreign Application Priority Data

Apr. 3, 2020 (BE) .................................. 2020/5215

(51) Int. Cl.

| | |
|---|---|
| ***H01R 13/627*** | (2006.01) |
| ***H01R 13/506*** | (2006.01) |
| *H01R 24/64* | (2011.01) |

(52) U.S. Cl.
CPC ....... *H01R 13/6272* (2013.01); *H01R 13/506* (2013.01); *H01R 24/64* (2013.01)

(58) Field of Classification Search
None
See application file for complete search history.

(56) References Cited

U.S. PATENT DOCUMENTS 5,354,212 A 10/1994 Bartle et al.
5,385,484 A 1/1995 Bartle et al.
(Continued)

FOREIGN PATENT DOCUMENTS

DE 102012111125 B4 4/2016
JP 2011171127 A 9/2011
WO WO 2014099840 A1 6/2014

*Primary Examiner* — Oscar C Jimenez
(74) *Attorney, Agent, or Firm* — LEYDIG, VOIT & MAYER, LTD.

(57) ABSTRACT

A plug-in connector for connecting to a mating plug-in connector includes: a contact receiving body, in which at least one contact element for connecting to a mating contact element of the mating plug-in connector is received; a cable receiving body connected to the contact receiving body, in which a cable for connecting to the at least one contact element of the contact receiving body is receivable; and a latching device, which is spring-elastic at least in regions, via which the plug-in connector is latchable to the mating plug-in connector. The latching device has a first end via which the latching device is connected to a plug-in face of the contact receiving body. The latching device has a second end opposite the first end. A first latching arm and a second latching arm are formed on the second end. The first and second latching arms in a latching position are latched.

8 Claims, 4 Drawing Sheets

(56) References Cited

U.S. PATENT DOCUMENTS

| | | | | |
|---|---|---|---|---|
| 6,821,139 | B1 * | 11/2004 | Wu | H01R 13/6275 439/352 |
| 6,890,205 | B1 * | 5/2005 | Wu | H01R 13/6275 439/906 |
| 7,037,129 | B2 * | 5/2006 | Lo | H01R 13/562 439/352 |
| 8,905,442 | B2 * | 12/2014 | Ishigami | H01R 13/627 292/228 |
| 2005/0233631 | A1 * | 10/2005 | Wu | H01R 13/6275 439/352 |
| 2016/0013584 | A1 * | 1/2016 | Liang | H01R 13/6275 439/354 |

* cited by examiner

PLUG-IN CONNECTOR AND PLUG-IN CONNECTOR ARRANGEMENT FOR SIMPLIFIED MANUFACTURING

CROSS-REFERENCE TO PRIOR APPLICATIONS

This application is a U.S. National Phase application under 35 U.S.C. § 371 of International Application No. PCT/EP2021/058579, filed on Apr. 1, 2021, and claims benefit to Belgian Patent Application No. BE 2020/5215, filed on Apr. 3, 2020. The International Application was published in German on Oct. 7, 2021 as WO/2021/198405 under PCT Article 21(2).

FIELD

The invention relates to a plug-in connector for connecting to a mating plug-in connector, wherein the plug-in connector has a contact receiving body in which at least one contact element for connecting to a mating contact element of the mating plug-in connector is received, a cable receiving body, connected to the contact receiving body, in which a cable for connecting to the at least one contact element of the contact receiving body can be received, and a latching device, which is spring-elastic at least in regions, via which the plug-in connector can be latched to the mating plug-in connector, wherein the latching device has a first end, via which the latching device is connected at a plug-in face of the contact receiving body, and wherein the latching device has a second end opposite the first end. The invention further relates to a plug-in connector arrangement with a plug-in connector and a mating plug-in connector.

BACKGROUND

Such plug connectors are so-called RJ-45 connectors, which can be used, in particular, as data connectors—for example, in telecommunications. By means of the latching device, the plug-in connector with its contact receiving body is held in a connected state in a mating plug-in connector designed as a socket, wherein, at the same time, the at least one contact element is, by the spring action of the latching device, pressed against at least one elastically-mounted mating contact element of the mating plug-in connector, whereby a kind of floating mounting of the contact between the plug-in connector and the mating plug-in connector can be formed.

Such a plug-in connector is known from DE 10 2012 111 125 B4, for example. Here, the latching device is of elongate design, wherein the latching device is fixedly connected, with a first end, to the contact receiving body and, with the second end opposite the first end, to the cable receiving body, by the second end being injection-molded onto the cable receiving body. In order to achieve a spring effect, the latching device is of an arcuate form between the two ends. In the manufacture of the plug-in connector, this embodiment requires an increased tooling and set-up effort in the injection-molding process. Particularly when angled cable outlets are present, increased effort is required.

SUMMARY

In an embodiment, the present invention provides a plug-in connector for connecting to a mating plug-in connector, comprising: a contact receiving body, in which at least one contact element for connecting to a mating contact element of the mating plug-in connector is received; a cable receiving body connected to the contact receiving body, in which a cable for connecting to the at least one contact element of the contact receiving body is receivable; and a latching device, which is spring-elastic at least in regions, via which the plug-in connector is latchable to the mating plug-in connector, wherein the latching device has a first end via which the latching device is connected to a plug-in face of the contact receiving body, wherein the latching device has a second end opposite the first end, wherein a first latching arm and a second latching arm are formed on the second end, and wherein the first latching arm and the second latching arm in a latching position are latched to the cable receiving body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
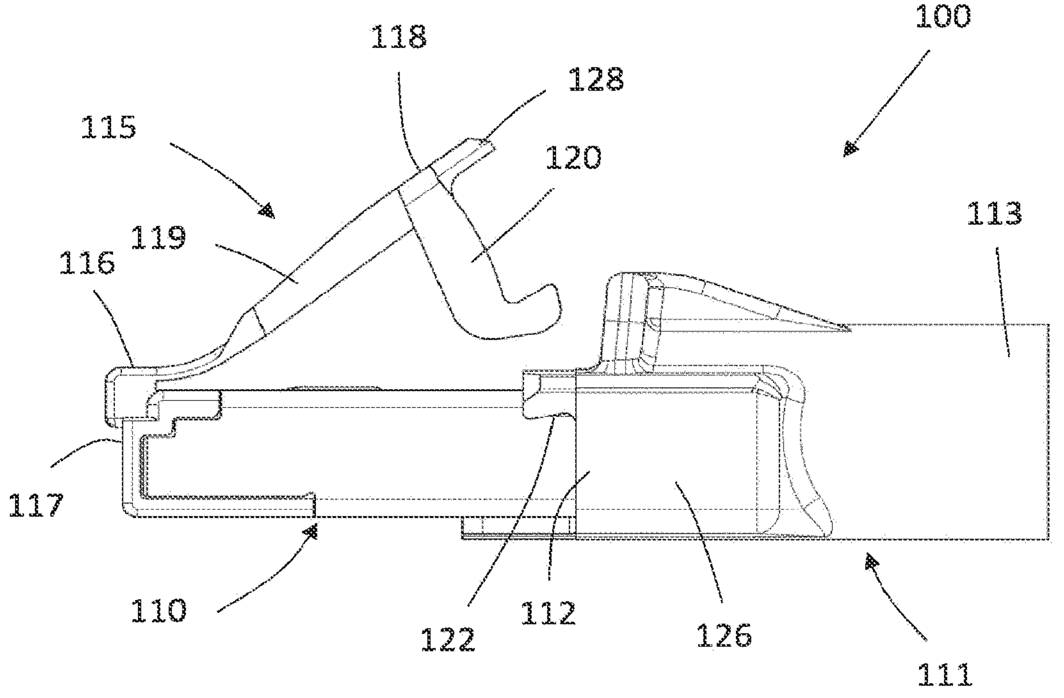
FIG. 1 a schematic view of a plug-in connector according to the invention in a state in which the latching device is detached from the cable receiving body, FIG. 2 a schematic view of the plug-in connector, shown in FIG. 1, in a latching position of the latching device with the cable receiving body, FIG. 3 a schematic view of the contact receiving body with the latching device without the cable receiving body, FIG. 4 a schematic representation of the plug-in connector shown in FIG. 1 with a connected cable, FIG. 5 a schematic representation of a plug-in connector according to the invention with an angled cable outlet, FIG. 6 a schematic representation of a further plug-in connector according to the invention with an angled cable outlet, FIG. 7 a schematic representation of a further plug-in connector according to the invention with an angled cable outlet, FIG. 8 a schematic representation of a further plug-in connector according to the invention with an angled cable outlet, and FIG. 9 a schematic view of a plug-in connector arrangement with a plug-in connector according to the invention and a mating plug-in connector.

In an embodiment, the present invention provides a plug-in connector and a plug-in connector arrangement which are distinguished by a simplified production effort.

The plug-in connector according to the invention is characterized in that a first latching arm and a second latching arm are formed at the second end of the latching device, wherein, in a latching position, the two latching arms are latched to the cable receiving body.

According to the invention, the latching device is therefore no longer integrally formed on the cable receiving body, but, rather, in production, the cable receiving body and the latching device are made independently and thus separately from one another. The outlay for the injection-molding process can be reduced by the separate production and in particular by a separately provided injection-molding process for the cable receiving body and the latching device. In the case of the cable receiving body, different cable outlet directions can thereby be realized with one mold construction, without the need to use a split. Only after all parts of the plug-in connector are mounted and the plug-in connector is to be inserted and connected to a mating plug-in connector is the latching device latched to the cable receiving body via the two latching arms and thus fastened. The latching arms are preferably latched to the cable receiving body in such a way that, in the latching position, the latching device can continue to apply a spring effect without the latching device being able to detach undesirably from the cable receiving body. A symmetrical latching of the latching device to the cable receiving body can be formed by the two latching arms. The latching device can, on the other hand, be formed integrally with the contact receiving body. The latching device can, for example, be injection-molded onto the contact receiving body. The contact receiving body and the latching device can both be formed from a plastic material, and in particular from the same plastic material.

In order to form the latching, it is preferably provided that a first undercut be formed on the cable receiving body, to which the first latching arm is latched in the latching position, and that a second undercut be formed on the cable receiving body, to which undercut the second latching arm is latched in the latching position. In the latching position, the latching arms can hook behind the undercuts, wherein one undercut is assigned to each latching arm. By the latching arms hooking behind the undercuts, a form-fitting connection between the latching arms and the undercuts, and thus between the cable receiving body and the latching device, can be formed, whereby a particularly secure and stable connection between the latching device and the cable receiving body can be realized. To establish the form-fitting connection, the latching arm preferably has a shape that is matched to the contour of the undercut.

The two undercuts are thus formed on two, opposite side faces of the cable receiving body. The latching arms can thus latch to the cable receiving body laterally thereto. The latching arms are thus latched to the cable receiving body preferably transversely to the main extension plane of the latching device or transversely to the longitudinal orientation of the connecting section, formed between the first end and the second end, of the latching device. In order to form the latching, the two latching arms are preferably initially guided along the cable receiving body laterally, before the latching position is reached. The two undercuts are preferably formed symmetrically to one another on the two side faces. The side faces preferably form transverse faces of the cable receiving body. The two latching arms preferably run parallel to one another, so that the two latching arms are spaced apart from one another. In the latching position, the cable receiving body can thus be positioned at least partially between the two latching arms.

The latching arms can each have a first arm section and a second arm section, forming a free end, with which second arm section the latching arms can latch to the cable receiving body in the latching position, wherein the second arm section can be formed at an angle to the first arm section. The latching arms can thus have an L-shape. The first arm section is preferably designed to be longer than the second arm section, with which the latching arms latch to the contact receiving body. The second arm section of the latching arms preferably extends parallel to the plug-in direction of the plug-in connector when connecting to a mating plug-in connector. The first arm section of the latching arms, however, preferably extends transversely to the plug-in direction.

In order to release the plug-in connector from a connection with the mating plug-in connector, a user can operate the latching device in order to release the latching of the latching device of the plug-in connector to a mating latching element of the mating plug-in connector. In order to facilitate this operation for a user, the latching device can have a gripping area for operating the latching device.

The gripping area can be arranged at the second end of the latching device between the first latching arm and the second latching arm. The effect of an operation of the latching device by a user can thus influence the latching arms directly, so that the simplest possible operation is possible for a user, with no great expenditure of force. The two latching arms are preferably directly connected to the gripping area. The latching arms are preferably exactly opposite each other, so that a symmetrical connection of the latching arms to the gripping area can be provided.

The gripping area is preferably designed such that the gripping area can extend transversely to the two latching arms. The gripping area can form a U-shape with the two latching arms. In a connected state of the latching device to the cable receiving body, this U-shape can encompass a part of the cable receiving body. The gripping area can extend transversely to the plug-in direction of the plug-in connector for connection to a mating plug-in connector. The gripping area is preferably located in a plane with the connecting section which extends between the two ends of the latching device. The latching arms preferably each extend in a plane which runs transversely to the plane spanned by the gripping area and the connecting section.

In order to facilitate the operation of the gripping area for a user, the gripping area can have the shape of a segment of a circle. Due to the circle segment shape, the gripping area can be designed to be as wide as possible, so that a finger of the user can be prevented from slipping off when operating the latching device. The arcuate section of the circle segment shape is preferably directed away from the first end of the latching device. The circle segment shape can be a semicircular shape, for example.

As a result of the now possible separate production of the cable receiving body and the latching device, variance of the design of the cable receiving body can be increased without additional outlay. Preferably, various cable receiving bodies can be produced and used, which differ in having different cable outlet directions. The cable receiving body preferably has a first end via which the cable receiving body is connected to the contact receiving body. Furthermore, the cable receiving body preferably has a second end in which the opening for inserting a cable is formed. The two ends of the cable receiving body can be formed at a 180° angle to one another, so that the two ends are formed in alignment with one another. However, it is also possible for the second end of the cable receiving body to be formed at an angle to the first end of the cable receiving body. The bend is preferably formed by a 90° angle. Any other angle—in particular, angles of between 40° and 160° between the first end and the second end—are also conceivable.

In an embodiment, the present invention also provides a plug-in connector arrangement which has a plug-in connector, embodied and developed as described above, and a mating plug-in connector, wherein the mating plug-in connector has a receiving opening into which the plug-in connector with its contact receiving body can be inserted in the plug-in direction, wherein, in the receiving opening, at least one mating latching element is formed which, in a plugged-in state, is latched to the latching device of the plug-in connector.

Figure 2:
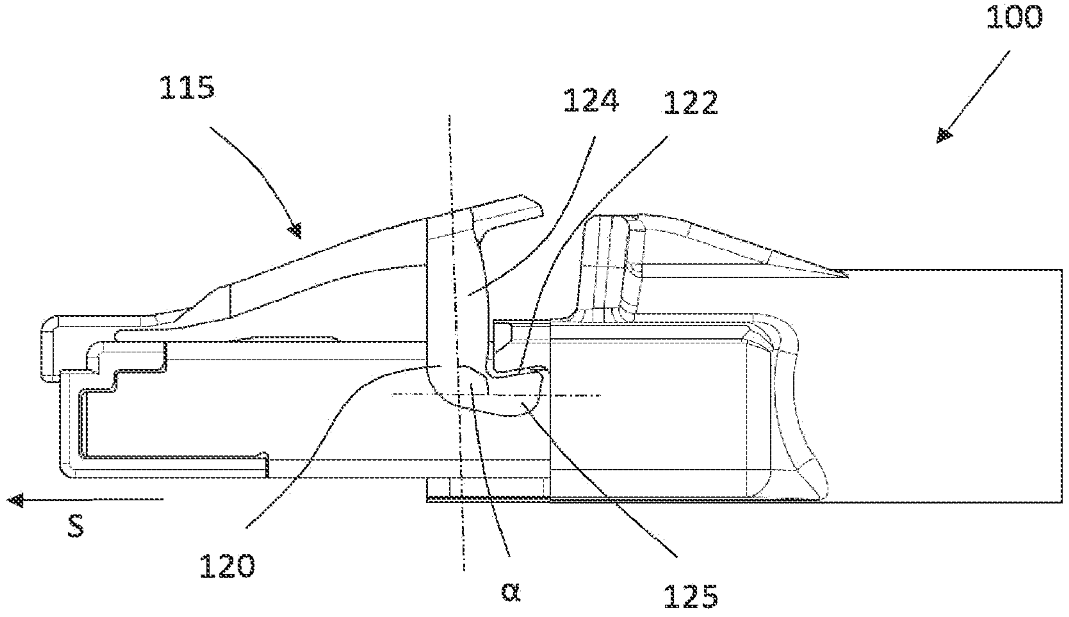

FIGS. 1 and 2 show a plug-in connector 100 according to the invention in two different positions. The plug-in connector 100 forms an RJ45 connector, which can be used in particular for data transmission.

The plug-in connector 100 has a contact receiving body 110, in which one or more contact elements are accommodated. Usually, the plug-in connector 100 forms a multi-pole plug-in connector 100, wherein, for example, eight contact elements can be accommodated and arranged in the contact receiving body 110. In a connected state of the plug-in connector 100 with a mating plug-in connector 200, the contact elements can electrically contact mating contact elements of the mating plug-in connector 200, as is shown schematically in FIG. 9.

A cable 400 is connected to the contact elements, wherein the cable 400 is inserted for this purpose in a cable receiving body 111 of the plug-in connector 100. The cable receiving body 111 has a first end 112 at which the cable receiving body 111 is connected to the contact receiving body 110. Furthermore, the cable receiving body 111 has a second end 113, in which an opening 114 is formed via which the cable 400 can be inserted into the cable receiving body 111, as shown in FIGS. 4 through 8.

The plug-in connector 100 further has a latching device 115, via which the plug-in connector 100 can be latched to the mating plug-in connector 200. The latching device 115 is designed to be at least partially spring-elastic.

The latching device 115 has a first end 116, via which the latching device 115 is connected at a plug-in face 117 of the contact receiving body 110. Furthermore, the latching device 115 has a second end 118 opposite the first end 116. A connecting section 119 of the latching device 115 is formed between the two ends 116, 118 of the latching device 115. The connecting section 119 has a web shape. The connecting section 119 extends parallel to the plug-in direction S, along which the plug-in connector 100 can be moved and inserted for connection to the mating plug-in connector 200.

The first end 116 of the latching device 115 is attached fixedly, and in particular non-detachably, to the contact receiving body 110. In the embodiment shown here, the latching device 115 is integrally formed with the contact receiving body 110. The latching device 115 and the contact receiving body 110 can thus be formed from one and the same material. For example, the latching device 115 and the contact receiving body 110 can be formed from a plastic material, and in particular from the same plastic material.

The latching device 115 can be fastened to the cable receiving body 111 via the second end 118. In the position shown in FIG. 1, the latching device 115 is still detached from the cable receiving body 111, and the latching device 115 is not yet fastened to the cable receiving body 115. FIG. 2, however, shows a latching position in which the latching device 115 is held on and fastened to the cable receiving body 111.

For fastening the latching device 115 to the cable receiving body 111, a first latching arm 120 and a second latching arm 121 are formed on the second end 118 of the latching device 115. In a latching position, these two latching arms 120, 121 can latch to the cable receiving body 111, as is shown in FIG. 2. For this purpose, the cable receiving body 111 has two undercuts 122, 123, so that the first latching arm 120 can hook behind at the first undercut 122, and the second latching arm 121 can hook behind at the second undercut 123.

In the latching position, the latching device 115 has a spring effect, without there being a risk of the latching device 115 being able to detach from the latching with the cable receiving body 111.

The two latching arms 120, 121 extend essentially parallel to one another. The latching arms 120, 121 are formed at a distance from each other.

The latching arms 120, 121 each have a first arm section 124, and a second arm section 125 adjoining the first arm section 125. The second arm section 125 forms a free end of the respective latching arm 120, 121. With the second arm section 125, the latching arms 120, 121 latch in each case with or at the undercuts 122, 123 of the cable receiving body 111. The second arm section 125 has a shorter length than the first arm section 124. Preferably, the second arm section 125 has a length that is less than half the length of the first arm section 124.

The second arm section 125 is formed at the two latching arms 120, 121 at an angle to the first arm section 124. The latching arms 120, 121 thus each have an L-shape. In the embodiment shown here, the second arm section 125 is formed at an angle $\alpha=90°$ to the first arm section 124.

The contour of the undercut 122, 123 is matched to the shape of the latching arm 120, 121 or to the shape of the second arm section 125 of the latching arm 120, 121, so that the latching arm 120, 121 with its second arm section 125 can engage in a form-fitting manner at the undercut 122, 123. The contour of the two undercuts 122, 123 is in each case designed such that a simple demolding from an injection-molding tool in the region of the undercuts 122, 123 is possible.

The two undercuts 122, 123 are formed on the first end 112 of the cable receiving body 111, at which end the cable receiving body 111 is arranged on the contact receiving body 110.

The two undercuts 122, 123 are formed on two opposing side faces 126, 127 of the cable receiving body 111, wherein these two side faces 126, 127 extend transversely to the plug-in direction S. The latching device 115 is therefore not held on the top of the cable receiving body 111, but is held on the cable receiving body 111 on the side thereof. In the latching position, the latching device 115 overlaps the cable receiving body 111 with its second end 118, as shown in FIG. 2.

To transfer into the latching position, the latching arms 120, 121 are guided laterally along the two side faces 126, 127 of the cable receiving body 111 until the latching arms 120, 121 hook in at the undercuts 122, 123. The latching arms 120, 121 spring open when guided along on the side faces 126, 127, or the latching arms 120, 121 are pushed apart by the cable receiving body 110. When latching into the undercuts 122, 123, the latching arms 120, 121 spring back from this deflected position, so that the cable receiving body 110 is firmly clamped with its first end 112 between the two latching arms 120, 121.

The second end 118 of the latching device 115 also has a gripping area 128, via which a user can operate the latching device 115. The gripping area 128 extends between the two latching arms 120, 121. The two latching arms 120, 121 are each directly connected to the gripping area 128 with their first arm section 124. The gripping area 128 is positioned relative to the two latching arms 120, 121 in such a way that the gripping area 128 together with the two latching arms 120, 121 form a U-shape. The second end 118 of the latching device thus has a kind of arciform shape 115.

Together with the connecting section 119, the gripping area 128 forms a T-shape. The gripping area 128 extends in a plane with the connecting section 119. The two latching arms 120, 121 each extend in a plane which is formed transversely to the plane defined by the connecting section 119 and the gripping area 128.

The gripping area 128 has a circle segment shape—here, in the form of a semicircular shape. The arcuate section of the semicircular shape of the gripping area 128 is directed away from the first end 116 of the latching device 115.

Figure 3:
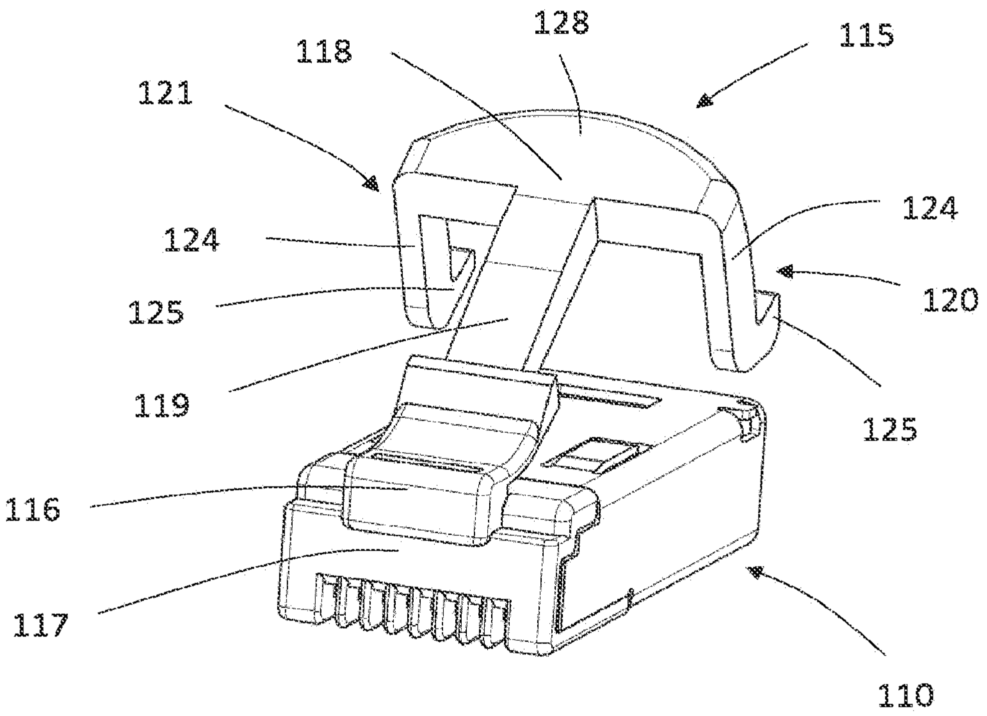

FIG. 3 shows the contact receiving body 110 together with the latching device 115, without the cable receiving body 111. Due to the special design of the latching device 115, the cable receiving body 111 can be produced separately from the latching device 115 and the contact receiving body 111, so that, with respect to its design, the cable receiving body 111 can have a greater variance without great additional outlay, as can be seen in the examples of FIGS. 4 through 8.

In the embodiments shown in FIGS. 4 through 8, the contact receiving body 110 and the latching device 115 are always of identical design. The cable receiving body 111, however, has a different design with regard to the cable outlet direction of the cable 400.

Figure 4:
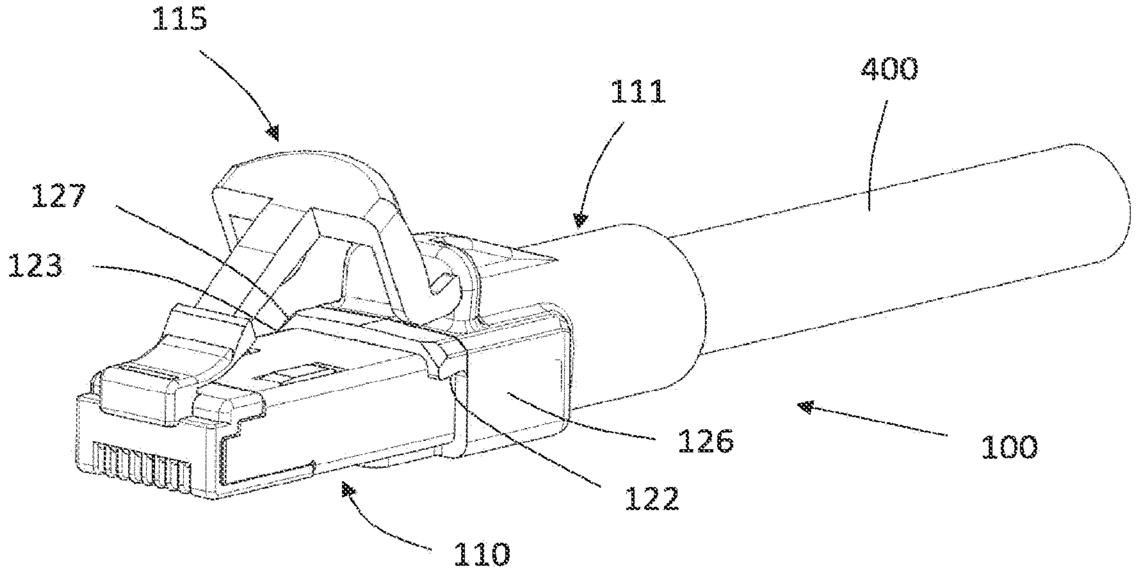
Figure 5:
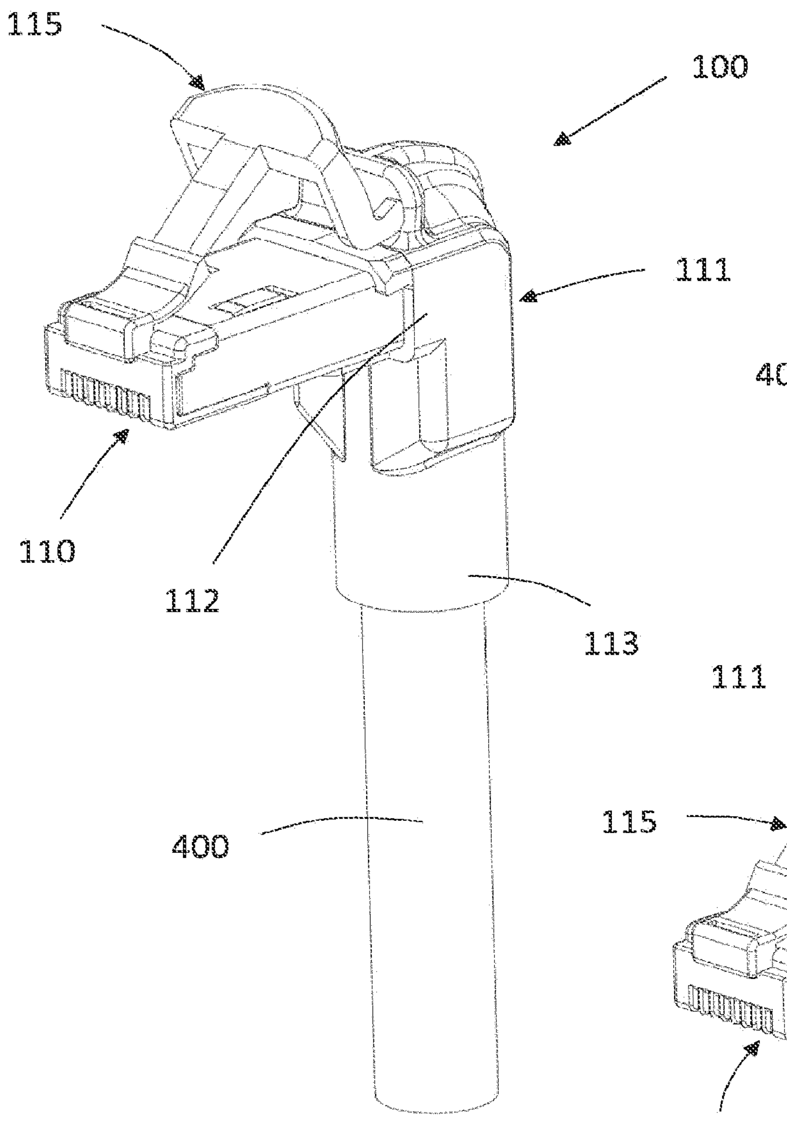
Figure 6:
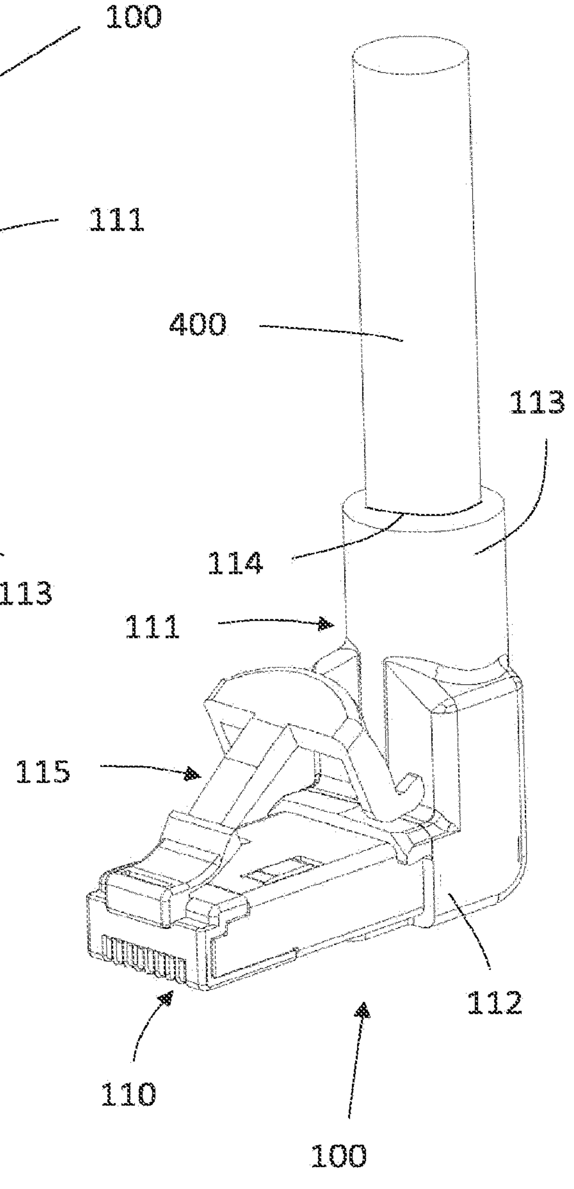
Figure 7:
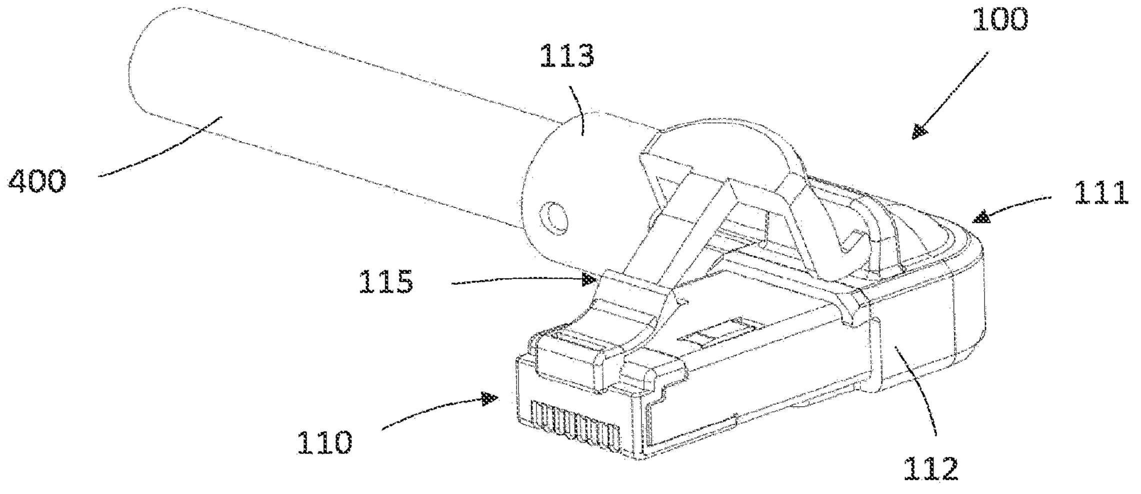
Figure 8:
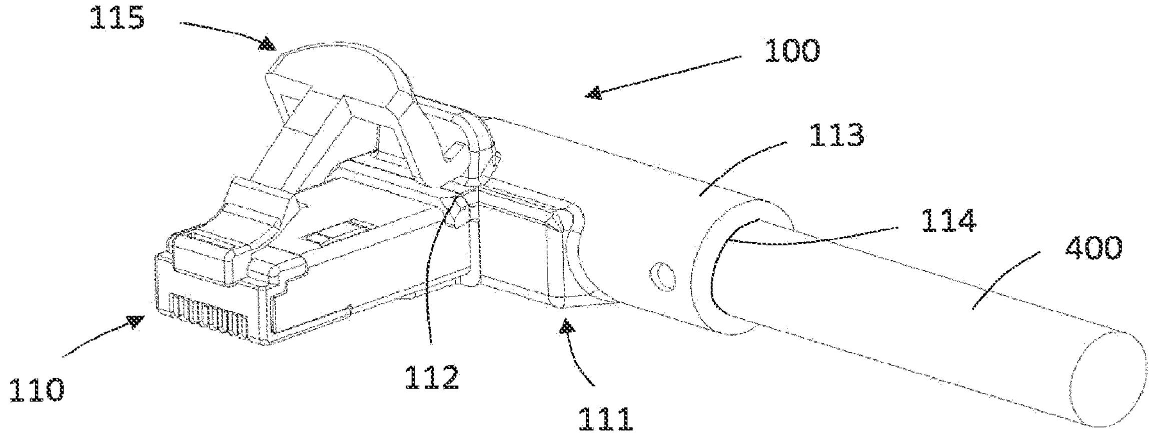

In the embodiment shown in FIG. 4, the two ends 112, 113 of the cable receiving body 111 are arranged in line with one another, and thus at a 180° angle to one another.

In the embodiments shown in FIGS. 5 through 8, however, the second end 113 is formed at an angle to the first end 112 of the cable receiving body 111, wherein the two ends 112, 113 extend at a 90° angle to one another in all embodiments.

Figure 9:
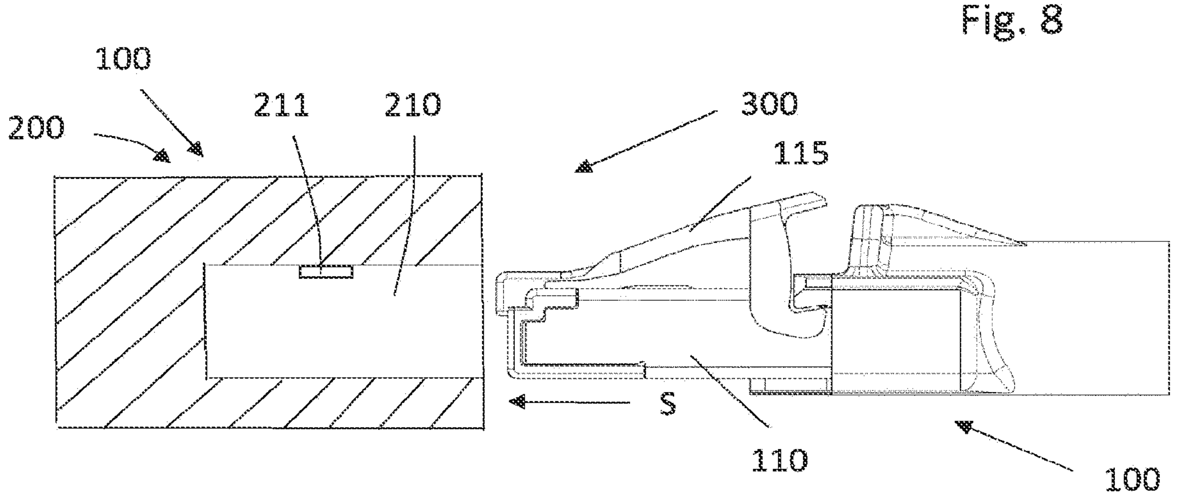

FIG. 9 schematically shows a plug-in connector arrangement 300 with a plug-in connector 100, as shown in FIGS. 1 and 2, and a mating plug-in connector 200. The mating plug-in connector 200 has a receiving opening 210 into which the plug-in connector 100 can be inserted with its contact receiving body 110 and, at least in some areas, with the latching device 115. In the receiving opening 210, a mating latching element 211 is formed which interacts with the latching device 115 of the plug-in connector 100 in the inserted position in order to hold the plug-in connector 100 to the mating plug-in connector 200.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

- 100 Plug-in connector
- 110 Contact receiving body
- 111 Cable receiving body
- 112 First end
- 113 Second end
- 114 Opening
- 115 Latching device
- 116 First end
- 117 Plug-in face
- 118 Second end
- 119 Connecting section
- 120 Latching arm
- 121 Latching arm
- 122 Undercut
- 123 Undercut
- 124 First arm section
- 125 Second arm section
- 126 Side face
- 127 Side face
- 128 Gripping area
- 200 Mating plug-in connector
- 210 Receiving opening
- 211 Mating latching element
- 300 Plug-in connector arrangement
- 400 Cable
- S Plug-in direction
- α Angle

The invention claimed is:

1. A plug-in connector for connecting to a mating plug-in connector, comprising:

a contact receiving body, in which at least one contact element for connecting to a mating contact element of the mating plug-in connector is received;

a cable receiving body connected to the contact receiving body, in which a cable for connecting to the at least one contact element of the contact receiving body is receivable; and a latching device, which is spring-elastic at least in regions, via which the plug-in connector is latchable to the mating plug-in connector, wherein the latching device has a first end via which the latching device is connected to a plug-in face of the contact receiving body, wherein the latching device has a second end opposite the first end, wherein a first latching arm and a second latching arm are formed on the second end, wherein the first latching arm and the second latching arm in a latching position are latched to the cable receiving body, wherein the latching device is integrally formed with the contact receiving body, wherein the first end of the latching device is attached fixedly to the contact receiving body, wherein the latching device has a gripping area for operating the latching device, wherein the gripping area is arranged at the second end between the first latching arm and the second latching arm, wherein a connecting section of the latching device is formed between the first end and the second end, wherein the gripping area together with the connecting section forms a T-shape, wherein the gripping area extends in a plane with the connecting section, and wherein the first latching arm and the second latching arm each extend in a plane formed transversely to the plane extending with the connecting section and the gripping area.

2. The plug-in connector of claim 1, wherein a first undercut is formed on the cable receiving body, to which an undercut of the first latching arm is latched in the latching position, and wherein a second undercut is formed on the cable receiving body, to which an undercut of the second latching arm is latched in the latching position.

3. The plug-in connector of claim 2, wherein the two undercuts are formed on two, opposite side faces of the cable receiving body.

4. The plug-in connector of claim 1, wherein the latching arms each have a first arm section and a second arm section, forming a free end, with which second arm section the latching arms latch to the cable receiving body in the latching position, and wherein the second arm section is formed at an angle to the first arm section.

5. The plug-in connector of claim 1, wherein the gripping area extends transversely to the two latching arms.

6. The plug-in connector of claim 1, wherein a gripping face has a circle segment shape.

7. The plug-in connector of claim 1, wherein the cable receiving body has a first end via which the cable receiving body is connected to the contact receiving body, wherein the cable receiving body has a second end in which an opening for inserting the cable is formed, and wherein the second end is at an angle to the first end.

8. A plug-in connector arrangement, comprising:

the plug-in connector of claim 1; and a mating plug-in connector, wherein the mating plug-in connector has a receiving opening into which the plug-in connector with its contact receiving body is insertable in the plug-in direction, and wherein, in the receiving opening, at least one mating latching element is formed which, in an inserted state, is latched to the latching device of the plug-in connector.

* * * * *